(12) United States Patent
Huo et al.

(10) Patent No.: US 12,644,975 B2
(45) Date of Patent: Jun. 2, 2026

(54) METHOD FOR USING OFFLINE ACCEPTANCE WORKSHOP OF MULTI-LINE LASER RADAR AUTOMATIC DRIVING DEVICE

(71) Applicant: FUJIAN (QUANZHOU)—HIT RESEARCH INSTITUTE OF ENGINEERING AND TECHNOLOGY, Fujian (CN)

(72) Inventors: Guanglei Huo, Fujian (CN); Ruifeng Li, Fujian (CN); Xiaochun Huang, Fujian (CN); Kuanchang Wen, Fujian (CN); Qichuan Chang, Fujian (CN); Peidong Liang, Fujian (CN)

( * ) Notice: Subject to any disclaimer, the term of this patent is extended or adjusted under 35 U.S.C. 154(b) by 584 days.

(21) Appl. No.: 18/265,444

(22) PCT Filed: Jul. 13, 2021

(86) PCT No.: PCT/CN2021/106041
§ 371 (c)(1),
(2) Date: Jun. 6, 2023

(87) PCT Pub. No.: WO2022/121310
PCT Pub. Date: Jun. 16, 2022

(65) Prior Publication Data
US 2024/0027594 A1    Jan. 25, 2024

(30) Foreign Application Priority Data
Dec. 7, 2020    (CN) .......................... 202011437055.0

(51) Int. Cl.
*G01S 7/497* (2006.01)
*G01S 17/931* (2020.01)
*B60W 60/00* (2020.01)

(52) U.S. Cl.
CPC .......... *G01S 7/4972* (2013.01); *G01S 17/931* (2020.01); *B60W 60/00* (2020.02); *B60W 2420/408* (2024.01)

(58) Field of Classification Search
CPC .... G01S 7/4972; G01S 17/931; B60W 60/00; B60W 2420/408
See application file for complete search history.

(56) References Cited

U.S. PATENT DOCUMENTS

| | | | | |
|---|---|---|---|---|
| 5,675,407 A | * | 10/1997 | Geng ...................... | G06T 7/521 |
| | | | | 356/123 |
| 2022/0214694 A1* | | 7/2022 | Hoofard .................... | B60T 7/22 |
| 2022/0283592 A1* | | 9/2022 | Yu ......................... | G05D 1/0248 |

FOREIGN PATENT DOCUMENTS

| | | | | | |
|---|---|---|---|---|---|
| CN | 108196260 A | * | 6/2018 | ............. | G01S 17/88 |
| CN | 111260913 A | * | 6/2020 | ........... | H04L 63/083 |

* cited by examiner

*Primary Examiner* — Isam A Alsomiri

(57) ABSTRACT

A method for using an offline acceptance workshop of a multi-line laser radar automatic driving device (100). The offline acceptance workshop comprises a workshop main body (1), an acceptance parking platform (2), an acceptance detection device (3) and an acceptance control system. The acceptance parking platform (2) comprises a horizontal platform (21), a parking positioning device (22) and a parking fixed point device (23); the acceptance detection device (3) is arranged on a side wall, opposite to the outlet (11), of the workshop main body (1); the acceptance control system is used for controlling the work; the workshop can automatically point and position the automatic driving device (100); whether the installation of the multi-line laser radar is accurate can be quickly and effectively detected; and whether the function is normal or not can be quickly and effectively detected.

7 Claims, 5 Drawing Sheets

METHOD FOR USING OFFLINE ACCEPTANCE WORKSHOP OF MULTI-LINE LASER RADAR AUTOMATIC DRIVING DEVICE

BACKGROUND OF THE INVENTION

The present invention relates to a workshop for offline acceptance detection of multi-line laser radar installed on automatic driving device and a using method thereof.

With the rapid development of intelligent technology, the application of multi-line laser radar is becoming increasingly widespread, especially on some automatic driving devices. In an automatic driving device, multi-line laser radar can simultaneously transmit and receive multiple beams of laser to achieve laser scanning within a 360 degree, obtaining laser scanning data for judging the surrounding environment and objects of vehicles. Therefore, the precise installation and normal use of multi-line laser radar on an automatic driving device are very important, which are the basic requirements for safe and effective automatic driving of the automatic driving device.

At present, there are various detection methods to detect whether the multi-line laser radar is accurately installed and its function can be used normally. However, on the basic of the use of multi-line laser radar on different outdoor moving means, installation at different positions on the device, etc., the existing detection methods may not be applicable, may not meet the requirements of comprehensive function detection and effective detection of the required normal function and the required accuracy, for example detecting whether the response frequency of the laser scanning function meets the normal requirements, detecting whether there is azimuth deviation in the laser scanning data, detecting whether the laser scanning data matches the real scene, etc. Therefore, the existing detection methods for accurate installation and normal use of the function of multi-line laser radars are not suitable for offline acceptance of the installation of multi-line laser radar in mass-produced automatic driving device.

Technical Problem

The existing detection methods for accurate installation and normal use of function of multi-line laser radars are not suitable for offline acceptance of the installation of multi-line laser radar in mass production automatic driving device.

BRIEF SUMMARY OF THE INVENTION

A method for using an offline acceptance workshop of a multi-line laser radar automatic driving device, which comprises the following steps:

S1. Initially, the offline acceptance workshop is in an initial state; the offline acceptance workshop comprises a workshop main body, an acceptance parking platform, an acceptance detection means, and an acceptance control system. The main body of the workshop is a square shaped workshop, with walls on three sides and entrance-exit on the other side. The acceptance parking platform is arranged on the ground inside the main body of the workshop for parking automatic driving device, which comprises a horizontal platform carrying the automatic driving device, a parking positioning means for automatically adjusting the forward parking position of the automatic driving device, and a parking pointing means for automatically adjusting the fixed-point position of the tires of the automatic driving device. The acceptance detection means is arranged on a side wall opposite to the entrance-exit of the workshop main body, and the front end of the automatic driving device faces the acceptance detection means during detection. The acceptance control system is used to control the device traction means, the acceptance parking platform, and the acceptance detection means in the workshop main body for operation. The acceptance detection means comprises a function detection means for detecting whether the laser scanning function of the multi-line laser radar is normal, and an installation detection means for detecting whether the installation position of the multi-line laser radar is accurate. The installation detection means consists of multiple scanning sign posts vertically arranged according to a set distance position, and the scanning sign posts are horizontally arranged in front of the acceptance parking platform. The function detection means comprises a motion track, a mobile car, and a target object. The motion track is horizontally arranged according to a set distance position between the front of the acceptance parking platform and the installation detection means. The mobile car is provided with a driving means that drives the mobile car to move on the motion track, and the target object is vertically installed on the mobile car. The automatic driving device enters and parks on the acceptance parking platform from the entrance-exit. When parking, the front end of the automatic driving device faces the acceptance detection means on the opposite side of the entrance-exit, and the front wheel and rear wheel of the automatic driving device respectively correspond to the parking positioning means.

S2. Control the action of the parking positioning means so that the front and rear wheels are positioned in the front and rear directions and cannot move forward or backward.

S3. Control the action of the parking pointing means so that the front and rear wheels are adjusted to the fixed-point position on the parking positioning means and fixed.

S4. Start the scanning work of the multi-line laser radar on the automatic driving device. The scanning work comprises laser scanning of multiple scanning sign posts by the multi-line laser radar, and generating installation detection laser scanning data. Start the mobile car to move according to the set moving speed, the multi-line laser radar performs laser scanning at the same time, and generates function detection laser scanning data.

S5. The acceptance control system obtains installation detection laser scanning data and function detection laser scanning data for data processing, analysis, and judgment. The processing, analysis, and judgment comprise frequency judgment, clustering judgment, horizontal judgment, and orientation judgment. The frequency judgment is as follows: the acceptance control system judges whether the number of frames of the laser scanning target object within a time period in the data matches the theoretical frame number of the laser scanning target object in the corresponding time period calculated by the known data through the function detection laser scanning data. If so, the laser scanning frequency is judged to be qualified, and if not, the laser scanning frequency is judged to be unqualified. The clustering judgment is as follows: using the clustering method to calculate whether there is a clustering of the target object in the laser scanning data. If not, it is judged whether the laser scanning has errors and is unqualified; if so, it is judged whether the coordinates of the clustering center point comply with the coordinate system of the multi-line laser radar, if so, it is judged that the multi-line laser radar function acceptance is qualified, if not, it is judged that the laser scanning has errors and is unqualified. The horizontal judgment and orientation judgment are as follows: the acceptance control system uses the least squares method to fit the linear equation of each scanning sign post in the multi-line laser radar coordinate system through the installation detection of laser scanning data. The equation is as follows $$\frac{X - x1}{m} = \frac{Y - y1}{n} = \frac{Z - z1}{p}$$

where X, Y, Z are the variables of the scanning point in the multi-line laser radar coordinate system, x1, y1, and z1 are the coordinates of a certain point in the multiline laser radar coordinate system, m is the direction along the X axis, n is the direction along the Y axis, and p is the direction along the Z axis. Calculate the value of p in the Z-axis direction of each scanning sign post is d, then calculate the mean value of p for multiple scanning sign posts, fit the centers of the X and Y planes of each scanning sign post in the multiline laser radar coordinate system into a line on the X and Y planes, and calculate the value of k according to the following formula, $$y = kx + b,$$

where x and y are the coordinates of the points on the line in the X and Y planes, k is the slope of the line, and b is the intercept of the line. Judge whether the mean of p is close to 1 (within the range of [−0.998, 0.998]) and whether the value of k is close to 0 (within the range of [−0.002, 0.002]). If the mean value of p is close to 1 and the value of k is close to 0, judge that the roll angle, pitch angle, and direction angle of the installation of multi-line laser radar are qualified (installed horizontally and with the O-direction angle facing the front), and end the detection. If the mean value of p is not close to 1 and/or the value of k is not close to 0, then judge that the installation of the multi-line laser radar is biased and the installation is unqualified. When the frequency judgment, clustering judgment, horizontal judgment, and orientation judgment are all qualified, the acceptance control system judges that the offline acceptance of the multi-line laser radar is passed, and provides the detection results, and ends the detection. When there is non-conformity in the above frequency judgment, clustering judgment, horizontal judgment, and/or orientation judgment, the acceptance control system judges that the offline acceptance of the multi-line laser radar is not passed, provides the detection results of the non-conformity in the judgment data, and ends the detection.

S6. After completing the detection, control the parking positioning means and parking pointing means to reset, and remove the automatic driving device from the acceptance parking platform.

A method for using an offline acceptance workshop of a multi-line laser radar automatic driving device, which comprises the following steps:

S1. Initially, the offline acceptance workshop is in an initial state. The offline acceptance workshop comprises a workshop main body, an acceptance parking platform, an acceptance detection means, and an acceptance control system. The main body of the workshop is a square shaped workshop, with walls on three sides and an entrance-exit on the other side. The acceptance parking platform is arranged on the ground inside the main body of the workshop for parking automatic driving device, which comprises a horizontal platform carrying the automatic driving device, a parking positioning means for automatically adjusting the forward parking position of the automatic driving device, and a parking pointing means for automatically adjusting the fixed-point position of the tires of the automatic driving device. The acceptance detection means is arranged on a side wall opposite to the entrance-exit of the workshop main body, and the front end of the automatic driving device faces the acceptance detection means during detection. The acceptance control system is used to control the action of the device traction means, the acceptance parking platform, and the acceptance detection means in the workshop main body. The offline acceptance workshop also comprises device parking platform and a device traction means. The device traction means is used to pull the automatic driving device from the device parking platform to the acceptance parking platform or from the acceptance parking platform to the device parking platform, which are respectively arranged on two opposite walls. The device parking platform is used for parking and adjusting the automatic driving device before the automatic driving device entering the main body of the workshop, which comprises a bearing platform carrying the automatic driving device, an orientation adjusting mechanism for driving the bearing platform to rotate the angle, and a traverse adjusting mechanism for driving the bearing platform to traverse position. The acceptance detection means comprises a function detection means for detecting whether the laser scanning function of the multi-line laser radar is normal, and an installation detection means for detecting whether the installation position of the multi-line laser radar is accurate. The installation detection means consists of multiple scanning sign posts vertically arranged according to a set distance position, and the scanning sign posts are horizontally arranged in front of the acceptance parking platform. The function detection means comprises a motion track, a mobile car, and a target object, wherein the motion track is horizontally arranged according to a set distance position between the front of the acceptance parking platform and the installation detection means, the mobile car is provided with a driving means for driving the mobile car to move on the motion track, and the target object is vertically installed on the mobile car. The automatic driving device is moved to the bearing platform of the device parking platform.

S2. Control the action of the orientation adjusting mechanism to make the bearing platform rotate to the direction where the front end of the automatic driving device faces the entrance-exit.

S3. Control the action of the traverse adjusting mechanism to make the bearing platform traverse and move to the middle section of the entrance-exit corresponding to the automatic driving device.

S4. Control the device traction means, first control its action to overlap with the automatic driving device, and then control the traction movement action to pull the automatic driving device out of the acceptance parking platform from the entrance-exit and park on the acceptance parking platform. When parking, the front wheels and rear wheels of the automatic driving device correspond to the parking positioning means S5. Control the action of the parking positioning means so that the front and rear wheels are positioned in the front and rear directions and cannot move forward or backward.

S6. Control the action of the parking pointing means so that the front and rear wheels are adjusted to the fixed-point position on the parking positioning means and fixed.

S7. Start the scanning work of the multi-line laser radar on the automatic driving device. The scanning work comprises laser scanning of multiple scanning sign posts by the multi-line laser radar, and generating installation detection laser scanning data. Start the mobile car to move according to the set moving speed, the multi-line laser radar performs laser scanning at the same time, and generates function detection laser scanning data.

S8. The acceptance control system obtains installation detection laser scanning data and function detection laser scanning data for data processing, analysis, and judgment. The processing, analysis, and judgment comprise frequency judgment, clustering judgment, horizontal judgment, and orientation judgment. The frequency judgment is as follows: the acceptance control system judges whether the number of frames of the laser scanning target object within a time period in the data matches the theoretical frame number of the laser scanning target object in the corresponding time period calculated by the known data through the function detection laser scanning data. If so, the laser scanning frequency is judged to be qualified, and if not, the laser scanning frequency is judged to be unqualified. The clustering judgment is as follows: using the clustering method to calculate whether there is a clustering of the target object in the laser scanning data. If not, it is judged that the laser scanning has errors and is unqualified. If so, it is judged whether the coordinates of the clustering center point comply with the coordinate system of the multi-line laser radar. If so, it is judged that the multi-line laser radar function acceptance is qualified. If not, it is judged that the laser scanning has errors and is unqualified. The horizontal judgment and orientation judgment are as follows: the acceptance control system uses the least squares method to fit the linear equation of each scanning sign post in the multi-line laser radar coordinate system through installation detection laser scanning data. The equation is as follows, $$\frac{X - x1}{m} = \frac{Y - y1}{n} = \frac{Z - z1}{p}$$

wherein X, Y, and Z are the variables of the scanning point in the multi-line laser radar coordinate system, x1, y1, and z1 are the coordinates of a certain point in the multi-line laser radar coordinate system, m is the direction along the X axis, n is the direction along the Y axis, and p is the direction along the Z axis. Calculate the value of p in the Z-axis direction of each scanning sign post, then calculate the mean value of p for multiple scanning sign posts, fit the centers of each scanning sign post in the X and Y planes of the multi-line laser radar coordinate system into a line on the X and Y planes, and calculate the value of k according to the following formula, $$y=kx+b,$$

where x and y are the coordinates of the points on the line in the X and Y planes, k is the slope of the line, and b is the intercept of the line. Judge whether the mean value of p is close to 1 (within the range of [−0.998, 0.998]) and whether the value of k is close to 0 (within the range of [−0.002, 0.002]). If the mean value of p is close to 1 and the value of k is close to 0, then judge the roll angle, pitch angle, and direction angle of the installation of multi-line laser radar are qualified (installed horizontally and with the O angle facing the front) and end the detection. If the mean value of p is not close to 1 and/or the value of k is not close to 0, judge there is a deviation in the installation of the multi-line laser radar and is unqualified. When the frequency judgment, clustering judgment, horizontal judgment, and orientation judgment are all qualified, the acceptance control system judge that the offline acceptance of the multi-line laser radar is passed, provide the detection results, and end the detection. When there is non-conformity in the frequency judgment, clustering judgment, horizontal judgment, and/or orientation judgment, the acceptance control system judges that the offline acceptance of the multi-line laser radar is not passed, provides the detection results of the non-conformity in the judgment data, and ends the detection;

S9. After completing the detection, if the automatic driving device fails to pass the offline acceptance, first control the parking positioning means and parking pointing means to reset, and then control the action of the device traction means to pull the automatic driving device out of the acceptance parking platform from the entrance-exit, and exit to the bearing platform of the device parking platform, and select to control the action of the orientation adjusting mechanism to make the bearing platform rotate according to the orientation needs of the automatic driving device, and then move the automatic driving device away from the offline acceptance workshop. If the automatic driving device passes the offline acceptance, first control the parking positioning means, the parking pointing means, and the device traction means to reset, and then control the automatic driving device to automatically drive and move away from the offline acceptance workshop. Alternatively, first control the parking positioning means and parking pointing means to reset, and then control the action of the device traction means to pull the automatic driving device out of the acceptance parking platform from the entrance-exit, and exit to the bearing platform of the device parking platform, and select to control the orientation adjusting mechanism action to make the bearing platform rotate according to the orientation needs of the automatic driving device, and then move the automatic driving device away from the offline acceptance workshop.

The device traction means comprises a traction moving track arranged on the inner side of the wall, a traction moving block sliding on the moving track, a traction connecting rod hinged on the traction moving block, a pushing cylinder arranged on the traction moving block and connected with the traction connecting rod, and a moving driving mechanism arranged on the traction moving block and traction moving track. The traction connecting rod and the automatic driving device are respectively provided with traction mating parts.

A sinking space is provided on the ground outside the entrance-exit of the workshop main body for the installation of a bearing platform. The traverse adjusting mechanism comprises a transverse track arranged at the bottom of the sinking space, a transverse platform sliding on the transverse track, and a transverse driving mechanism connected with the transverse platform for driving its transverse movement. The bearing platform is a circular bearing platform covering the upper surface of the sinking space. The orientation adjusting mechanism comprises a rotating supporting connecting plate and a rotating driving mechanism connected between the lower surface of the bearing platform and the upper surface of the traversing platform.

The horizontal platform is horizontally arranged with a front wheel positioning section groove and a rear wheel positioning section groove, and the parking positioning means is respectively arranged in the front wheel positioning section groove and the rear wheel positioning section groove. The parking positioning means comprises multiple bearing steel beams arranged to fill the front wheel positioning section groove or the rear wheel positioning section groove, a supporting driving cylinder respectively arranged at the bottom of each steel beam, guiding structures respectively arranged at both ends of each steel beam and pressure sensors arranged on each steel beam. The bearing steel beam can make its upper surface flush with the upper surface of the horizontal platform under the driving support of the supporting driving cylinder, or the upper surface of multiple bearing steel beams can form staggered concave wheel grooves.

The parking pointing means comprises a rear wheel pointing adjusting means and a front wheel pointing adjusting means. The rear wheel pointing adjusting means is respectively arranged at both ends of the rear wheel positioning section groove, which comprises a rear wheel moving push block and a rear wheel pushing block drive. The rear wheel moving push block is arranged on the upper surface of the horizontal platform and vertically crosses the rear wheel positioning section groove. The rear wheel pushing block drive is arranged outside the end of the rear wheel positioning section groove and is connected with the rear wheel moving push block for driving its movement. The rear wheel moving push block is provided with a rear wheel pushing block guiding structure.

The front wheel pointing adjusting means is respectively arranged at both ends of the front wheel positioning section groove, which comprises a front wheel moving push block and a front wheel pushing block drive. The front wheel moving push block is arranged on the upper surface of a horizontal platform and vertically crosses the front wheel positioning section groove. The front wheel pushing block drive is arranged outside the end of the front wheel positioning section groove and is connected with the front wheel moving push block for driving its movement. The front wheel moving push block is provided with a front wheel pushing block guiding structure. And/or, the front wheel pointing adjusting means is symmetrically arranged on both sides of the middle point of the front wheel positioning section groove, which comprises a T-shaped moving push block, a T-shaped push block drive, and a T-shaped push block guiding structure. The T-shaped moving push block has a T-shaped cross-section, and is arranged on the upper surface of the horizontal platform and vertically crosses the front wheel positioning section groove. Sliding grooves are respectively arranged on both sides of the front wheel positioning section groove. The two ends of the T-shaped vertical arm of the T-shaped moving push block are respectively provided with connecting rods embedded in the corresponding sliding grooves. The T-shaped push block drive is respectively arranged in the sliding grooves and connected with the connecting rods for driving its movement. The T-shaped push block guiding structure is arranged between the connecting rods and the sliding grooves.

BENEFICIAL EFFECTS OF THE INVENTION

In the method of the present invention, the acceptance parking platform, the acceptance detection means, the device parking platform, and the device traction means of the offline acceptance workshop can achieve better automation work, namely high automation performance. Moreover, the structural setting can automatically adjust the position of the automatic driving device, achieving a better fixed-point positioning to improve the detection accuracy of the acceptance detection. The overall structure of the workshop is compact and occupies a small space, which can be used to quickly and effectively detect whether the installation of multi-line laser radar is accurate and whether the function is normal. The fixed-point positioning operation for automatic vehicles in the above method steps is simple and rapid, and the acceptance results of the installation and detection of multi-line laser radar are accurate and reliable. This method can carry out reasonable and orderly steps to improve the detection accuracy and is easy to implement. It is particularly suitable for the detection and use of mass-produced automatic driving device production lines, thus achieving the purpose and effect of the present invention.

The above method obtains function detection laser scanning data through multi-line laser radar scanning moving target objects to calculate, analyze, and judge the results. Specifically, whether the scanning frequency of multi-line laser radar and the laser scanning data are consistent with the real scene is judged by judging whether the number of laser scanning frames within a certain time period matches the theoretical frame number, using clustering methods to judge the existence of clustering, and whether the coordinates of the clustering center point match the coordinate system of multi-line laser radar, so as to determine whether the multi-line laser radar can be used normally.

The precise judgment of the installation of multi-line laser radar in the above method is based on the horizontal judgment and orientation judgment. These two judgments are based on three criteria: whether the direction angle of the multi-line laser radar is 0 direction angle corresponding to the front, and whether the pitch and roll angles are horizontal. The acceptance method of the present invention uses the multi-line laser radar to scan multiple scanning sign posts to obtain installation detection laser scanning data to judge the direction angle, the roll angle and pitch angle, which correspond to the three criteria for accurately judging the installation of multi-line laser radar. A comprehensive calculation, analysis, and judgment of scanning multiple sign posts at one time are performed. Specifically, the least squares method is used to fit the linear equation of multiple scanning sign posts scanned by a multi-line laser radar in the multi-line laser radar coordinate system, calculate the value of p for each scanning sign post, then calculate the average value of p for multiple scanning sign posts, and calculate the value of k for each scanning sign post in the X and Y planes of the multi-line laser radar coordinate system to fit into a line on the X and Y planes, in order to judge whether the direction angle of the multi-line laser radar is 0 degrees corresponding to the front, and whether the roll and pitch angles are horizontal.

DETAILED DESCRIPTION OF THE INVENTION

Figure 1:
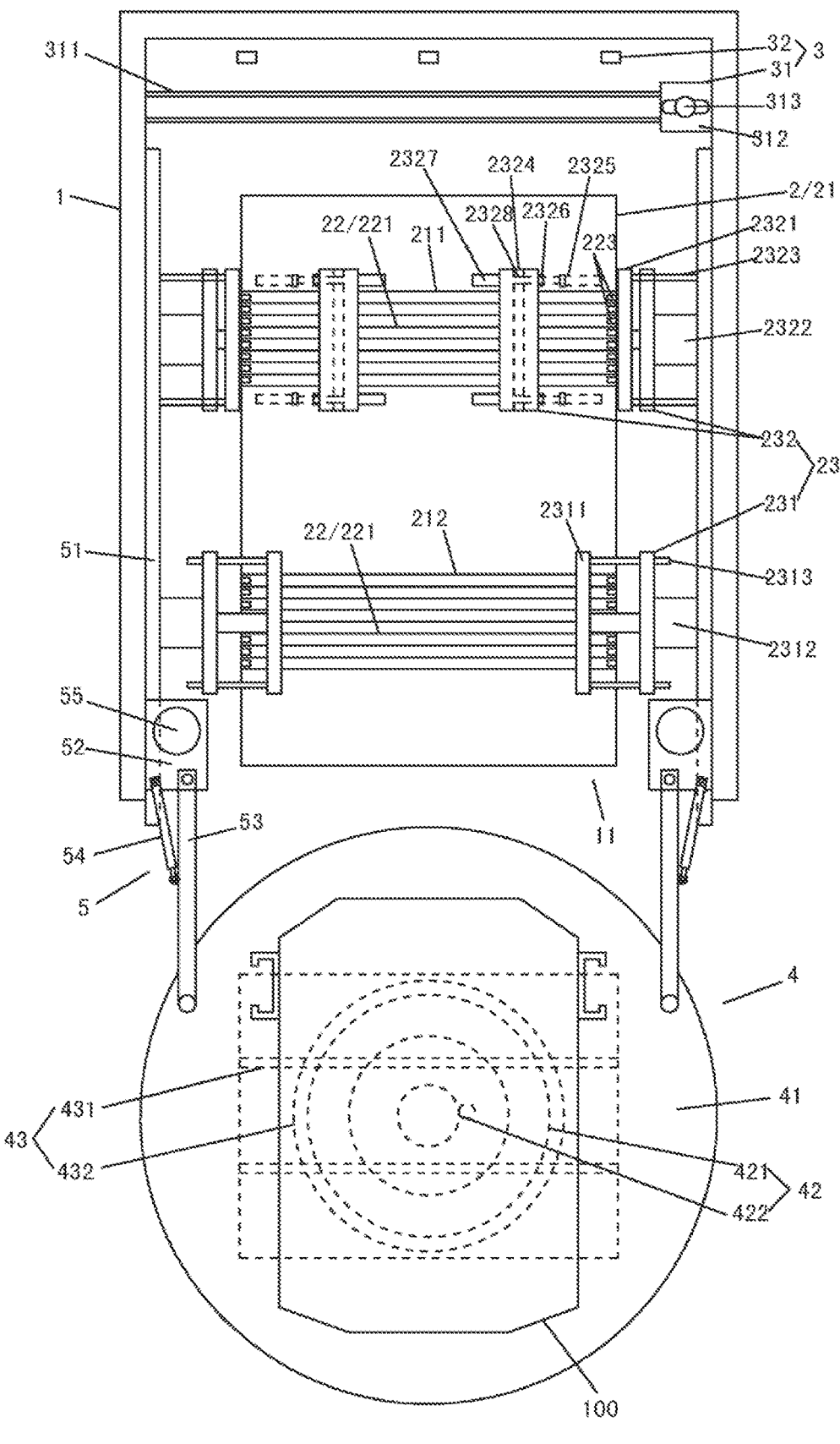
FIG. 1 is a schematic diagram of the structure of an offline acceptance workshop of a multi-line laser radar automatic driving device according to the invention.
Figure 2:
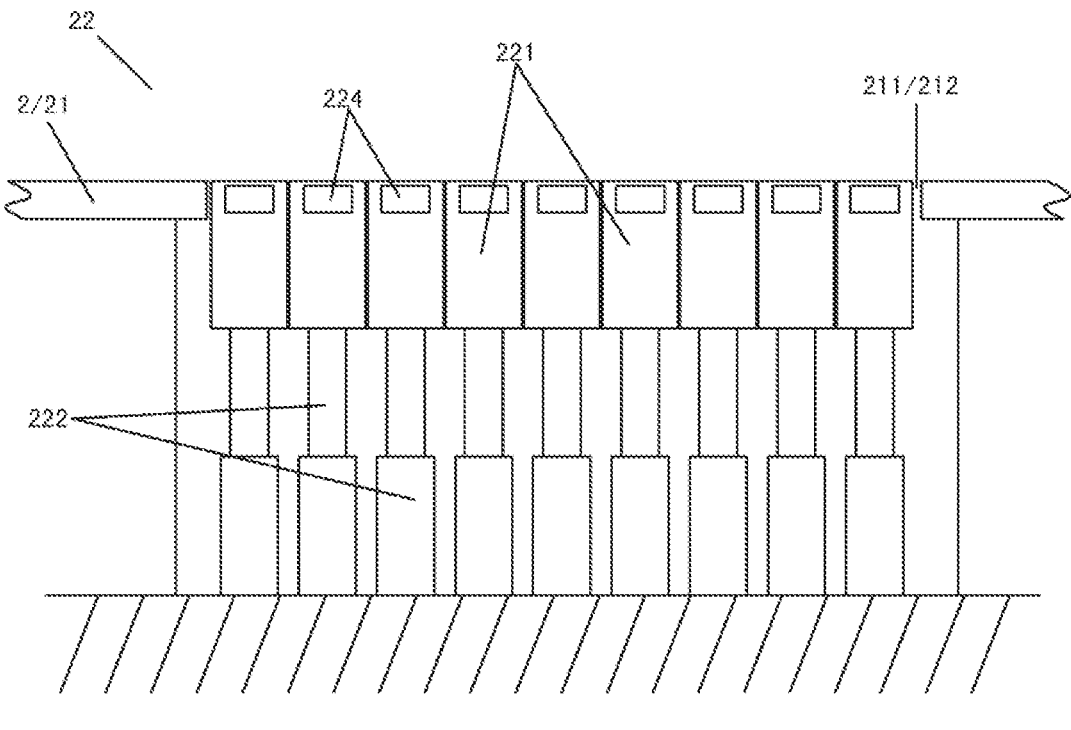
FIGS. 2 and 3 are schematic diagrams of the different state structures of the parking positioning means of the acceptance parking platform according to the present invention.
Figure 3:
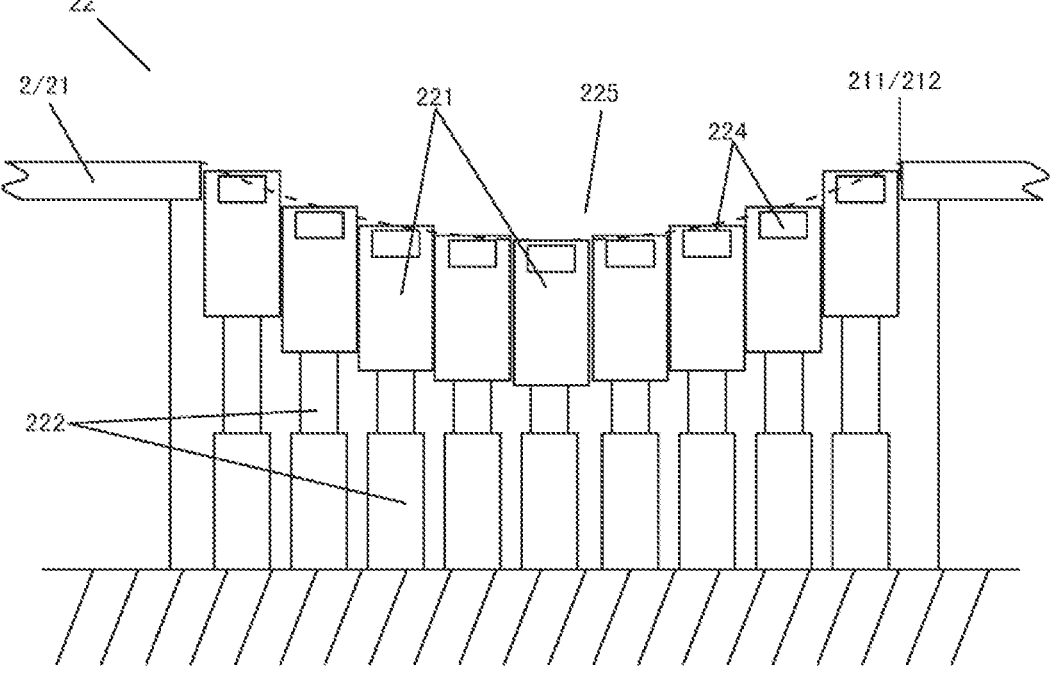
Figure 4:
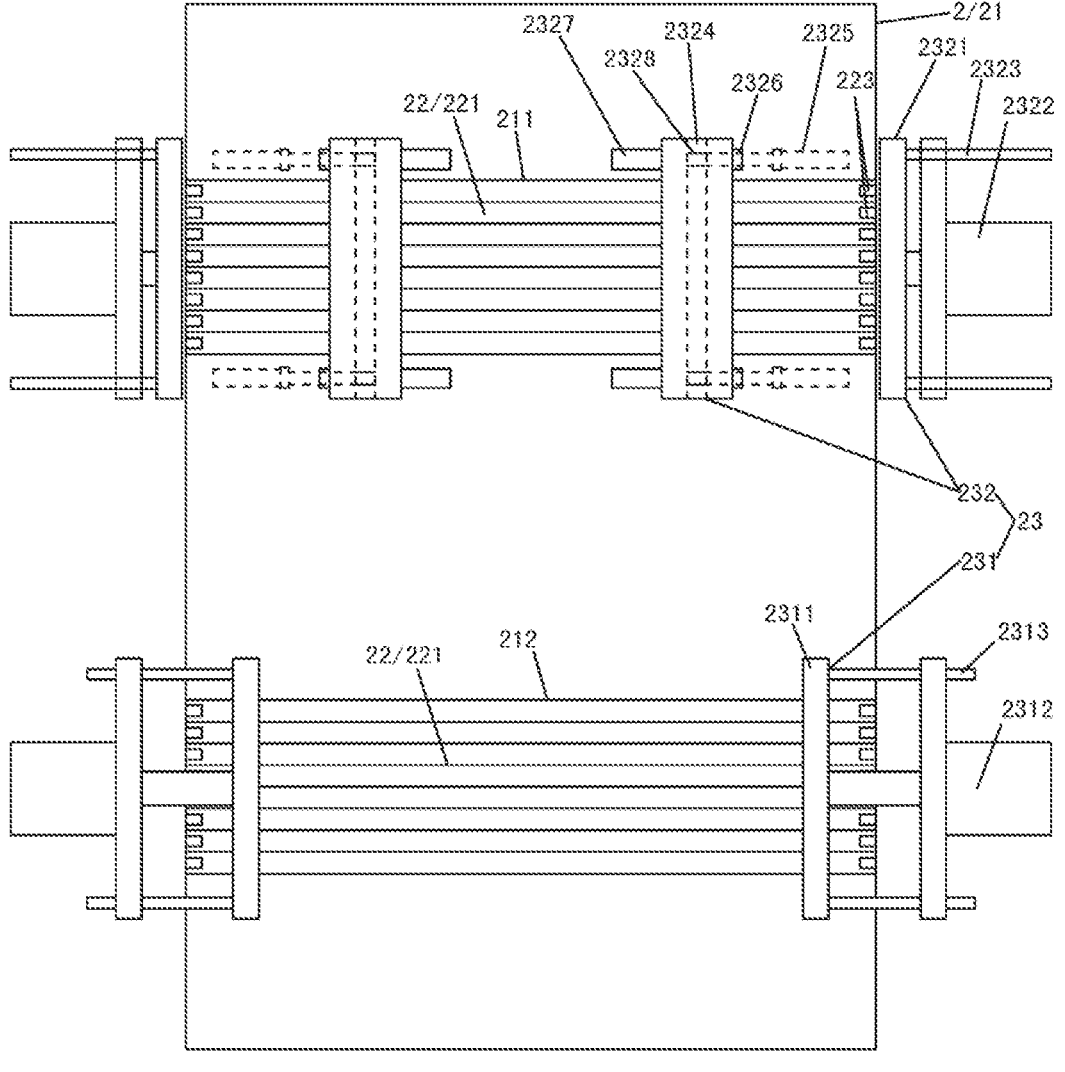
FIG. 4 is a structural schematic diagram of the parking pointing means of the acceptance parking platform according to the present invention.
Figure 5:
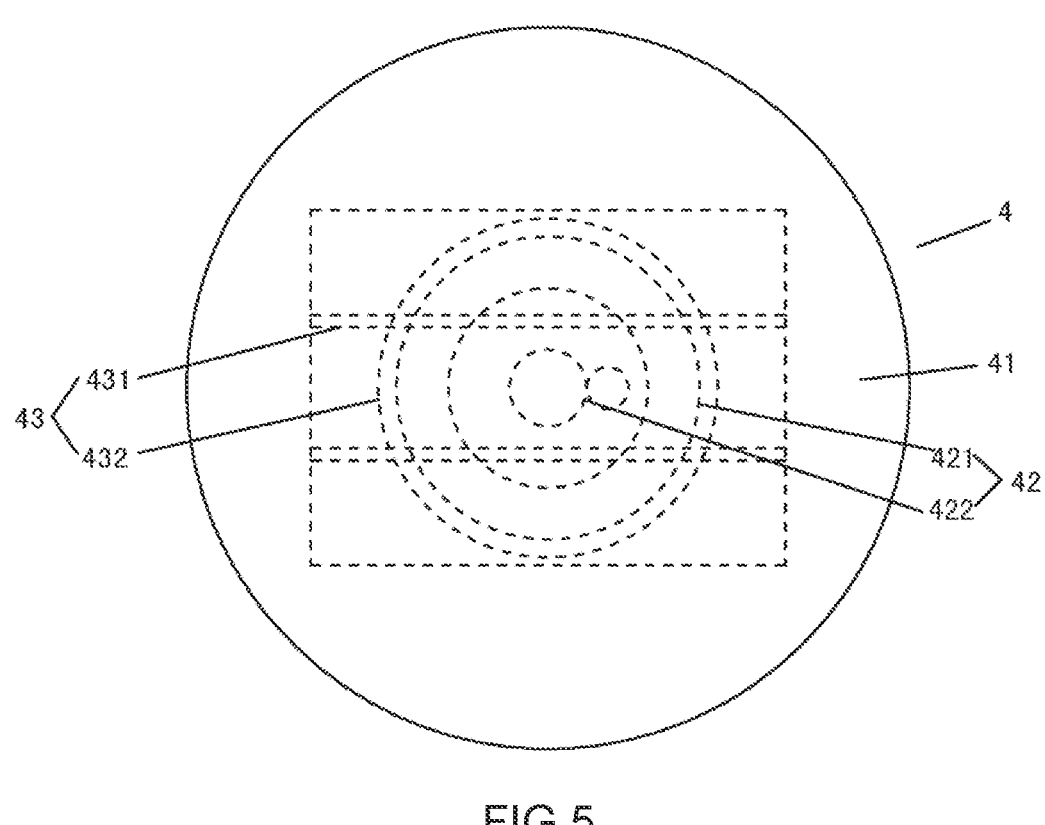
FIG. 5 is a structural schematic diagram of the device parking platform of the acceptance parking platform according to the present invention.
Figure 6:
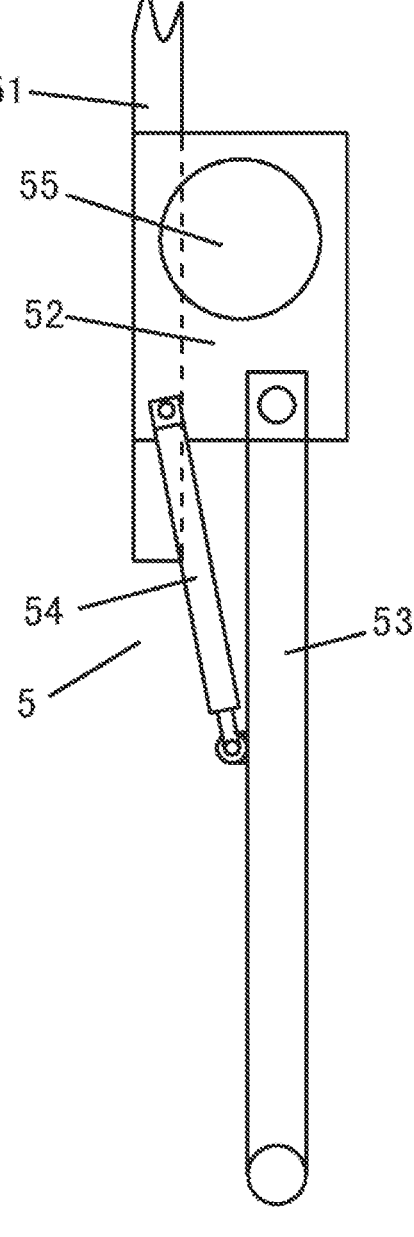
FIG. 6 is a structural schematic diagram of the device traction means of the acceptance stop platform according to the present invention.

The present invention relates to a method for using an offline acceptance workshop of a multi-line laser radar automatic driving device, which discloses an offline acceptance workshop as shown in FIGS. 1, 2, 3, 4, 5 and 6. The workshop comprises a main body 1, an acceptance parking platform 2, an acceptance detection means 3, an device parking platform 4, an device traction means 5 and an acceptance control system (this system mainly comprises the electronic control system of the circuit structure and the detection system of the working program, which is not visible in the figure). The offline acceptance workshop is used for multi-line laser radar detection, such as inspection and cleaning, of unmanned automatic vehicles with multi-line laser radars. If the detection is qualified, the automatic driving device can be used offline. If the detection is not qualified, it can be adjusted and replaced online. Usually, the bottom of this automatic driving device's body comprises front and rear wheels, and the rear wheels usually comprise left and right rear wheels. There are two types of front wheels; one method is that only one front wheel is in the middle, while the other method comprises left and right front wheels. The multi-line laser radar is usually installed in the middle of the top surface of the front of the vehicle.

The workshop main body 1 in the present invention is a square independent workshop, with walls on three sides to unify the surrounding environment and avoid other substances that may affect the laser scanning results. The other side of the workshop main body 1 is the entrance-exit 11. The acceptance detection means 3 is arranged in workshop main body 1 on a side wall opposite to the entrance-exit 11, and the front end of the automatic driving device faces the acceptance detection means 3 during detection. The acceptance control system is used to control the operation of the device traction means 5, acceptance parking platform 2, and acceptance and detection means 3 in workshop main body 1. In this embodiment, this system is not described in detail and does not affect a clear understanding of the structure of the workshop.

The acceptance detection means 3 in the present invention comprises a function detection means 31 for detecting whether the laser scanning function of the multi-line laser radar is normal, and an installation detection means 32 for detecting whether the installation position of the multi-line laser radar is accurate. The installation detection means 32 consists of multiple scanning sign posts vertically arranged according to the set distance positions. The spacing distance between the scanning sign post and the acceptance parking platform 2 should not exceed the optimal scanning distance of laser scanning detection. The scanning sign posts are arranged horizontally in front of the acceptance parking platform 2. As shown in the figure, three scanning sign post are arranged vertically at intervals, the middle one corresponds to the 0 direction angle directly in front of the multi-line laser radar during operation, and the two adjacent scanning sign posts should be arranged at the same interval distance. The height of each scanning sign post should be higher than the height of the vehicle from the horizontal plane height of the acceptance parking platform 2 to meet the scanning range of the multi-line laser radar. The width of each scanning sign post should be about 5 centimeters. The function detection means 31 comprises a motion track 311, a mobile car 312, and a target object 313. The motion track 311 is arranged transversely between the front of the acceptance parking platform 2 and the installation detection means 31 according to the set distance position, and the set distance position should not exceed the optimal scanning distance for laser scanning detection. The length of the motion track 32 should be larger than the width of the vehicle 1. In this embodiment, the motion travel of the motion track is 2 meters as an example. The mobile car 312 is provided with a driving means that drives the mobile car 312 to move on the motion track 311, and the target object 313 is vertically installed on the mobile car 312. The target object 313 can be a humanoid prop or other copying prop. The scanning sign post is located at the rear relative to the target object 313, which can avoid the influence of the scanning sign post when multi-line laser radar scans the target object.

The acceptance parking platform 2, as shown in the figure, is arranged on the bottom surface of the workshop main body 1 for parking the automatic driving device 100, which comprises a horizontal platform 21 carrying the automatic driving device 100, a parking positioning means 22 for automatically adjusting the forward parking position of the automatic driving device 100, and a parking pointing means 23 for automatically adjusting the fixed-point position of tires of the automatic driving device 100. As shown in the figure, the specific structure involved in this embodiment is as follows: on the horizontal platform 21, a rear wheel positioning section groove 212 is horizontally arranged towards the entrance-exit 11, and a front wheel positioning section groove 211 is horizontally arranged towards the opposite side of the entrance-exit 11. The opening distance of these two grooves is arranged according to the wheelbase range of the front and rear wheels of common automatic driving device vehicles, and the opening width of each groove can be the same or different, so that the acceptance parking platform 2 can adapt to the positioning and parking of various types of vehicles of different sizes. The parking positioning means 22 are respectively arranged in the front wheel positioning section groove 211 and the rear wheel positioning section groove 212, which comprises multiple bearing steel beams 221 arranged to fill the front wheel positioning section groove 211 or the rear wheel positioning section groove 212, supporting driving cylinders 222 provided at the bottom of each steel beam 221, guiding structures 223 provided at both ends of each steel beam 221, and pressure sensors 224 provided on each steel beam 221.

As shown in the figure, the bearing steel beam 221, under the driving support of the supporting driving cylinder 222 and the limitation of the guiding structure 223, can be ascended and descended. The bearing steel beam 221 can ascend until its upper surface is flush with the upper surface of the horizontal platform 21, or descend until the upper surface of multiple bearing steel beams 221 forms a staggered concave wheel groove 225, thereby achieving the positioning of the front and rear wheels of the vehicle in the front and rear directions of the horizontal platform 21. Since multiple bearing steel beams 221 are arranged, a bearing steel beam 221 located at the lowest point of the wheel groove 225 during the concave process can be controlled based on the vehicle wheelbase, so as to achieve wheel positioning of vehicles of different sizes and types. In addition, pressure sensors 224 are installed on each bearing steel beam 221, which can be used to sense the position of the front and rear wheels, i.e. the vehicle position and can be used to automatically judge the lowest bearing steel beam 221 during the staggered descent, thereby forming a wheel groove 225. The concave shape formed by the staggered descent of wheel groove 225 here is an arc shape that forms a fit with the circumferential surface of the wheel. After the wheel is embedded in wheel groove 225, it cannot move forward and backward to complete the positioning in this direction. With the above structural settings, the acceptance control system quickly and accurately determines the front and rear wheel positions, and performs wheel positioning in the front and rear directions to achieve the automatic positioning effect of automatic adjusting and adaptation. After completing the detection, control the action of the supporting driving cylinder 222 to drive all the descended bearing steel beams 221 to ascend and reset to be flush with the horizontal platform 21, so as to facilitate exit.

The parking pointing means 23 is used for positioning the vehicle in the left and right directions, and the positioning in this direction is the final fixed position of the vehicle, the parking position for detection. The parking pointing means 23 comprises a rear wheel pointing adjusting means 231 and a front wheel pointing adjusting means 232, and typically the rear wheel is two wheels. In this embodiment, the rear wheel pointing adjusting means 231 is respectively arranged at both ends of the rear wheel positioning section groove 212, which comprises a rear wheel moving push block 2311 and a rear wheel pushing block drive 2312. The rear wheel moving push block 2311, as shown in the figure, is a rectangular block arranged on the upper surface of the horizontal platform 21 and vertically crosses the rear wheel positioning section groove 212. The rear wheel pushing block drive 2312 is arranged outside the end of the rear wheel positioning section groove 212 and connected with the rear wheel moving push block 2311 for driving its movement. The rear wheel moving push block 2311 is provided with a rear wheel pushing block guiding structure 2313, which enables the rear wheel moving push block 2311 to move smoothly. During operation, the side of the rear wheel moving push block 2311 contacts with the outer side of the corresponding rear wheel, so as to push the rear wheel to move left and right. When the two rear wheel moving push blocks 2311 push and clamp the two rear wheels according to the setting, the fixed position is reached.

Since the front wheel of in the vehicle are one-wheel and two-wheel, the arrangement of the front wheel pointing adjusting means 232 disclosed in this embodiment is actually arranged according to actual needs, and both can be arranged or only one can be arranged. In the first arrangement, as shown in the figure, the front wheel pointing adjusting means 232 is respectively arranged at both ends of the front wheel positioning section groove 211, which comprises a front wheel moving push block 2321 and a front wheel pushing block drive 2322. The front wheel moving push block 2321 is arranged on the upper surface of the horizontal platform 21 and vertically crosses the front wheel positioning section groove 211. The front wheel pushing block drive 2322 is arranged outside the end of the front wheel positioning section groove 211 and is connected with the front wheel moving push block 2321 for driving the front wheel to move. The front wheel moving push block 2321 is provided with a front wheel pushing block guiding structure 2323, which is the same as the structure of the rear wheel pointing adjusting means 231 and is more suitable for adjusting the front wheels of vehicles with two front wheels. The operation and use principle are the same, referring to the above description, and will not be repeated here. In the second arrangement, the front wheel pointing adjusting means 232 is symmetrically arranged on both sides of the middle point of the front wheel positioning section groove, as shown in the figure, which comprises a T-shaped moving push block 2324, a T-shaped push block drive 2325, and a T-shaped push block guiding structure 2326. The T-shaped moving push block 234 has a T-shaped cross-section, and is arranged on the upper surface of the horizontal platform 21 and vertically crosses the front wheel positioning section groove 211. The two sides of the front wheel positioning section groove 211 are respectively provided with sliding grooves 2327. The T-shaped vertical arm of the T-shaped moving push block 2324 is provided with connecting rods 2328 embedded in the corresponding sliding groove 2327, and the sliding groove 2327 is provided with an installation cavity. The T-shaped push block drive 2325 is respectively arranged in the installation cavity of the sliding groove and connected with connecting rods 2328 for driving its movement. The T-shaped push block guiding structure 2326 is arranged between the connecting rod 2328 and the sliding groove 2327. The operation principle of the front wheel pointing adjusting means 232 of this structure is the same as the previous one, but this structure setting can achieve adjusting of the front wheels in two directions. When the front wheel is a one-wheel vehicle, the front wheel corresponds to the two T-shaped moving push blocks 2324, therefore, when adjusting, the two T-shaped moving push blocks 2324 move to clamp the front wheel to complete the positioning of the front road. When the front wheel is a two-wheel vehicle, the two T-shaped moving push blocks 2324 move away from each other in opposite directions and move close to the inner side of the front wheel on the corresponding side, completing the adjusting of the front wheel.

The above-mentioned rear wheel pointing adjusting means 231 and front wheel pointing adjusting means 232 are simultaneously driven to achieve better driving force to push the vehicle to move. After completing the detection, the rear wheel pointing adjusting means 231 and front wheel pointing adjusting means 232 are reset.

In this embodiment, the device parking platform 4 and the device traction means 5 are mainly used for vehicles entering and exiting the acceptance parking platform to achieve automatic adjusting and traction. For workshops without automatic adjusting and traction, these two parts can be removed accordingly. The present embodiment discloses a structure provided with these two parts, specifically as shown in the figure. The device traction means 5 is used to pull the automatic driving device (i.e. the vehicle mentioned earlier) from the device parking platform 4 to the acceptance parking platform 2 or from the acceptance parking platform 2 to the device parking platform 4, which are respectively arranged on the two opposite walls on the left and right sides and comprises a traction moving track 51 arranged on the inner side of the wall, a traction moving block 52 sliding on the moving track 51, a traction connecting rod 53 hinged on the traction moving block 52, a pushing cylinder 54 arranged on the traction moving block 52 and connected with the traction connecting rod 53, and a moving driving mechanism 55 arranged on the traction moving block 52 and the traction moving track 51. The moving driving mechanism 55 described herein may be a structure arrangement of a motor-driven driving mechanism. The driving mechanism can be in the mating mode of gears and racks, which is a prior art that can be easily obtained by those skilled in this art and will not be described in detail here. The traction connecting rod 53 and the automatic driving device are respectively provided with traction mating parts. As shown in the figure, the traction mating part on the automatic driving device is a U-shaped block fixed on the side of the vehicle. When the vehicle needs to be towed, the moving driving mechanism 55 drive the traction moving block 52 to move, so that traction mating parts on the traction connecting rod 53 correspond to the U-shaped block (automatic corresponding function can be achieved through sensor settings), control the action of the pushing cylinder 54, and the traction mating parts on the traction connecting rod 53 are embedded in the U-shaped groove of the U-shaped block. After completing the traction connection on both sides, the moving driving mechanism 55 is activated to drive the traction moving block 52 to move, thereby achieving the work of traction entry and exit.

The device parking platform 4 is used for parking adjusting before automatic driving device entering the workshop main body, which can facilitate precise alignment of traction work. The device parking platform 4 comprises a bearing platform 41 carrying the automatic driving device, an orientation adjusting mechanism 42 driving the bearing platform 41 to rotate the angle, and a traverse adjusting mechanism 43 driving the bearing platform 41 to traverse the position. As shown in the figure, a sinking space is provided on the ground outside the entrance-exit 11 of the workshop main body 1 for the installation of the bearing platform 41. The traverse adjusting mechanism 43 comprises a transverse track 431 arranged at the bottom of the sinking space (the transverse direction here is as shown in the figure, consistent with the left and right directions inside the workshop main body 1), a transverse platform 432 sliding on the transverse track 431, and a transverse driving mechanism connected with the transverse platform 432 for driving its transverse movement (not visible in the figure). The bearing platform 432 is a circular bearing platform covering the top of sinking space, and the orientation adjusting mechanism 42 comprises a rotating supporting connecting plate 421 and a rotating driving mechanism 422 connected between the lower surface of the bearing platform 41 and the upper surface of the transverse platform 432. The rotating driving mechanism 422 drives the bearing platform 41 to rotate and adjust the direction of the vehicle's front end, and the traverse driving mechanism drives the traverse platform 432 to move on the traverse track 431, therefor the front position of the vehicle can be adjusted to correspond to the central position of the entrance-exit. The adjusting here can also be realized by using the sensing means to automatically sense whether it is adjusted to the required position, which can also facilitate the traction action of the device traction means 5.

The following are two methods for using an offline acceptance workshop of a multi-line laser radar automatic driving device of the present invention. The first method is for an offline acceptance workshop without two structures: a device parking platform 4 and a device traction means 5, and the second method is for an offline acceptance workshop with two structures: a device parking platform 4 and an device traction means 5.

The first method is the use of an offline acceptance workshop of a multi-line laser radar automatic driving device. The method steps are as follows:

S1. Initially, the offline acceptance workshop is in the initial state. The automatic driving device 100 enters from the entrance-exit and parks on the acceptance parking platform 2. When parking, the front end of the automatic driving device 100 faces the acceptance detection means 4 on the opposite side of the entrance-exit 11, and the front and rear wheels of the automatic driving device 100 respectively correspond to the parking positioning means 22.

S2. Control the action of parking positioning means 22 so that the front and rear wheels are positioned in the front and rear directions and cannot move forward or backward.

S3. Control the action of the parking pointing means 23 to adjust the front and rear wheels to the fixed position on the parking positioning means 22 and fix.

S4. Start the scanning work of the multi-line laser radar 101 on the automatic driving device 100. The scanning work comprises laser scanning of multiple scanning sign posts by the multi-line laser radar, and generating installation detection laser scanning data. Start the mobile car to move according to the set moving speed, the multi-line laser radar simultaneously performs laser scanning, and generates function detection laser scanning data.

S5. The acceptance control system obtains installation detection laser scanning data and function detection laser scanning data for data processing, analysis, and judgment. The processing, analysis, and judgment comprise frequency judgment, clustering judgment, horizontal judgment, and orientation judgment. The frequency judgment is as follows: the acceptance control system judges whether the number of frames of the laser scanning target object within a time period in the data matches the theoretical number of frames of the laser scanning target object within the corresponding time period calculated by the known data through the function detection laser scanning data. For example, in this embodiment, the motion track is 2 meters, the movement speed of the mobile car is 1 meter per second, and the frequency of the multi-line laser radar is 10 Hz per second. Theoretically, when the mobile car moves 2 meters on the motion track, the function detection laser scanning data should be 20 frames. At this time, if the function detection laser scanning data has 18-22 frames of data, which is consistent, and it is judged that the laser scanning frequency is qualified. If the laser scanning data does not reach 18 frames, which is not consistent, and it is judged that the laser scanning frequency is unqualified. The clustering judgment is as follows: using the clustering method to calculate whether there is a clustering of the target object in the laser scanning data. If not, it is judged that the laser scanning has errors and is unqualified; If so, it is judged whether the coordinates of the clustering center point comply with the coordinate system of the multi-line laser radar, If so, it is judged that the multi-line laser radar function acceptance is qualified, If not, it is judged that the laser scanning has errors and is unqualified. The horizontal judgment and orientation judgment are as follows: the acceptance control system uses the least squares method to fit the linear equation of each scanning sign post in the multi-line laser radar coordinate system through the installation detection laser scanning data. The equation is as follows:

$$\frac{X - x1}{m} = \frac{Y - y1}{n} = \frac{Z - z1}{p}$$

Wherein X, Y, and Z are the variables of the scanning point in the multi-line laser radar coordinate system, x1, y1, and z1 are the coordinates of a certain point in the multi-line laser radar coordinate system, m is the direction along the X axis, n is the direction along the Y axis, and p is the direction along the Z axis. Calculate the value of p in the Z-axis direction of each scanning sign post, and then calculate the mean value of p for multiple scanning sign posts, and fit the centers of X and Y planes of each scanning post in the multi-line laser radar coordinate system into a line on X and Y planes. Calculate the value of k according to the following formula, $$y = kx + b,$$

where x and y are the coordinates of the points on the line on the X and Y planes, k is the slope of the line, and b is the intercept of the line. Judge whether the mean of p is close to 1 (within the range of [−0.998, 0.998]) and whether the value of k is close to 0 (within the range of [−0.002, 0.002]). If the mean of p is close to 1 and the value of k is close to 0, it is judged that the roll angle, the pitch angle, and the direction angle of the installation of the multi-line laser radar are qualified (installed horizontally and with the O-direction angle facing the front), and end the detection. If the mean value of p is not close to 1 and/or the value of k is not close to 0, then it is judged that the installation of the multi-line laser radar is biased, indicating that the installation is unqualified. When the above frequency judgment, clustering judgment, horizontal judgment, and orientation judgment are all qualified, the acceptance control system judges that the offline acceptance of the multi-line laser radar is passed, provides the detection results, and ends the detection. When there are non-conformity in the frequency judgment, the clustering judgment, the horizontal judgment, and/or the orientation judgment, the acceptance control system judges that the offline acceptance of the multi-line laser radar is not passed, provides the detection results of the non-conformities in the judgment data, and ends the detection;

S6. After completing the detection, control the parking positioning means 22 and parking pointing means 23 to reset, and remove the automatic driving device 100 from the acceptance parking platform. For those who fail to pass the offline acceptance, the technical personnel will perform corresponding processing for the multi-line laser radar based on the unqualified judgment data provided by the acceptance control system, such as replacement, parameter adjusting, installation adjusting, etc. After processing, they will return to the above steps for laser scanning detection.

The second method is a method for using an offline acceptance workshop of a multi-line laser radar automatic driving device. The method steps are as follows:

S1. Initially, the offline acceptance workshop is in an initial state, and the automatic driving device 100 is moved to the bearing platform 41 of the device parking platform 4.

S2. Control the action of the orientation adjusting mechanism 42 to make the bearing platform 41 rotate until the front end of the automatic driving device 100 faces the direction of the entrance-exit 11. The direction here is vertically parallel to the corresponding direction, not to the directional direction.

S3. Control the action of the traverse adjusting mechanism 43 to make the bearing platform 41 traverse and move to the middle section of the entrance-exit 11 corresponding to the automatic driving device 100

S4. Control the device traction means 5, first control its action to overlap with the automatic driving device 100, the specific action being described in the structural section above, and then control the traction movement action to pull into the automatic driving device 100 from the entrance-exit 11 and park on the acceptance parking platform 2. When parking, the front and rear wheels of the automatic driving device 100 correspond to the parking positioning means 22 respectively.

S5. Control the action of parking positioning means 22 so that the front and rear wheels are positioned in the front and rear directions and cannot move forward or backward.

S6. Control the action of the parking positioning means 23 to adjust the front and rear wheels to the fixed position on the parking positioning means 22 and fix.

S7. Start the scanning work of the multi-line laser radar 101 on the automatic driving device 100. The scanning work comprises laser scanning of multiple scanning sign posts by the multi-line laser radar, and generating installation detection laser scanning data. Start the mobile car to move according to the set moving speed, the multi-line laser radar simultaneously performs laser scanning, and generates function detection laser scanning data.

S8. The acceptance control system obtains installation detection laser scanning data and function detection laser scanning data for data processing, analysis, and judgment. The processing, analysis, and judgment comprise frequency judgment, clustering judgment, horizontal judgment, and orientation judgment. The frequency judgment is as follows: the acceptance control system judges whether the number of frames of the laser scanning target object within a time period in the data matches the theoretical number of frames of the laser scanning target object within the corresponding time period calculated by the known data through the function detection laser scanning data. For example, in this embodiment, the motion track is 2 meters, the movement speed of the mobile car is 1 meter per second, and the frequency of the multi-line laser radar is 10 Hz per second. Theoretically, after the mobile car moves 2 meters on the moving track, function detection laser scanning data should be 20 frames. At this time, if there are 18-22 frames of function detection laser scanning data, which is consistent, and it is judged that the laser scanning frequency is qualified. If the laser scanning data does not reach 18 frames, which is not consistent, and it is judged that the laser scanning frequency is unqualified. The clustering judgment is as follows: using the clustering method to calculate whether there is a clustering of the target object in the laser scanning data, if not, it is judged that the laser scanning has errors and is unqualified; if so, it is judged whether the coordinates of the clustering center point comply with the coordinate system of the multi-line laser radar, if so, it is judged that the multi-line laser radar function acceptance is qualified, if not, it is judged that the laser scanning has errors and is unqualified. The horizontal judgment and orientation judgment are as follows: the acceptance control system uses the least squares method to fit the linear equation of each scanning sign post in the multi-line laser radar coordinate system through the installation detection of laser scanning data. The equation is as follows:

$$\frac{X - x1}{m} = \frac{Y - y1}{n} = \frac{Z - z1}{p}$$

Wherein X, Y, and Z are the variables of the scanning point in the multi-line laser radar coordinate system, x1, y1, and z1 are the coordinates of a certain point in the multi-line laser radar coordinate system, m is the direction along the X axis, n is the direction along the Y axis, and p is the direction along the Z axis. Calculate the value of p in the Z-axis direction of each scanning sign post, then calculate the mean value of p for multiple scanning sign posts, and fit the centers of X and Y planes of each scanning post in the multi-line laser radar coordinate system into a line on X and Y planes. Calculate the value of k according to the following formula, $y=kx+b,$ where x and y are the coordinates of the points on the line on the X and Y planes, k is the slope of the line, and b is the intercept of the line. Judge whether the mean of p is close to 1 (within the range of [−0.998, 0.998]) and whether the value of k is close to 0 (within the range of [−0.002, 0.002]). If the mean of p is close to 1 and the value of k is close to 0, it is judged that the roll angle, pitch angle, and direction angle of the installation of the multi-line laser radar are qualified (installed horizontally and with the O-direction angle facing the front), end the detection. If the mean value of p is not close to 1 and/or the value of k is not close to 0, then it is judged that the installation of the multi-line laser radar is biased, indicating that the installation is unqualified; When the frequency judgment, the clustering judgment, the horizontal judgment, and the orientation judgment are all qualified, the acceptance control system judges that the offline acceptance of the multi-line laser radar is passed, provides the detection results, and ends the detection. When there is non-conformity in the above frequency judgment, the clustering judgment, the horizontal judgment, and/or the orientation judgment, the acceptance control system judges that the offline acceptance of the multi-line laser radar is not passed, provides the detection results of the non-conformity in the judgment data, and ends the detection.

S9. After completing the detection, if the automatic driving device 100 fails to pass the offline acceptance, first control the parking positioning means 22 and parking positioning means 23 to reset, and then control the device traction means 5 to pull the automatic driving device 100 out of the acceptance parking platform 2 from the entrance-exit 11, and exit to the bearing platform 41 of the device parking platform 4. According to the orientation needs of the automatic driving device 100, control the action of orientation adjusting mechanism 42 to make the bearing platform 41 rotate, and then move the automatic driving device 100 away from the offline acceptance workshop.

If the automatic driving device 100 passes the offline acceptance, it can achieve normal automatic driving. Therefore, the parking positioning means 22, the parking positioning means 23, and the device traction means 5 can be controlled to reset first, and then the automatic driving device 100 can be directly controlled to automatically drive and move away from the offline acceptance workshop. Alternatively, it can be operated in a non-pass manner. First, control the parking positioning means 22 and parking positioning means 23 to reset, and then control the device traction means 5 to pull the automatic driving device 100 out of the acceptance parking platform 2 from the entrance-exit 11 and exit to the bearing platform 41 of the means parking platform 4, and control the action of the orientation adjusting mechanism 42 to make the bearing platform 41 rotate according to the orientation needs of the automatic driving device 100 and move the automatic driving device 100 away from the offline acceptance workshop. Similarly, for those who fail to pass the offline acceptance, the technical personnel will perform corresponding processing for the multi-line laser radar based on the unqualified judgment data provided by the acceptance control system, such as replacement, parameter adjusting, installation adjusting, etc. After processing is completed, they will go back to the previous steps and perform laser scanning detection again.

What is claimed is:

1. A method for using an offline acceptance workshop of a multi-line laser radar automatic driving device, wherein the method steps are as follows:

S1, initially, the offline acceptance workshop is in the initial state; the offline acceptance workshop comprises a workshop main body, an acceptance parking platform, an acceptance detection means, and an acceptance control system; the main body of the workshop is a square shaped workshop, with walls on three sides and an entrance-exit on the other side; the acceptance parking platform is arranged on the ground inside the main body of the workshop for parking the automatic driving device, which comprises a horizontal platform carrying the automatic driving device, a parking positioning means for automatically adjusting the forward parking position of the automatic driving device, and a parking pointing means for automatically adjusting the fixed-point position of the tires of the automatic driving device; the acceptance detection means is arranged on a side wall opposite to the entrance-exit of the workshop main body, and the front end of the automatic driving device faces the acceptance detection means during detection, and the acceptance control system is used to control the device traction means, the acceptance parking platform, and the acceptance detection means in the workshop body for operation;

the acceptance detection means comprises a function detection means for detecting whether the laser scanning function of the multi-line laser radar is normal, and an installation detection means for detecting whether the installation position of the multi-line laser radar is accurate;

the installation detection means consists of multiple scanning sign posts vertically arranged according to a set distance position, the scanning sign posts being horizontally arranged in front of the acceptance parking platform; the function detection means comprises a motion track, a moving car, and a target object, the motion track being horizontally arranged according to a set distance position between the front of the acceptance parking platform and the installation detection means, the moving car being provided with a driving means that drives the moving car to move on the motion track, and the target object being vertically installed on the moving car;

parking the automatic driving device on the acceptance parking platform from the entrance-exit, when parking, the front end of the automatic driving device faces the acceptance detection means on the opposite side of the entrance-exit, as well as the front and rear wheels of the automatic driving device correspond to the parking positioning means;

S2, controlling the action of the parking positioning means so that the front and rear wheels are positioned in the front and rear directions and cannot move forward or backward;

S3, controlling the action of the parking pointing means so that the front and rear wheels are adjusted to the fixed-point position on the parking positioning means and fixed;

S4, starting the scanning work of the multi-line laser radar on the automatic driving device, the scanning work comprising laser scanning of multiple scanning sign posts by the multi-line laser radar, and generating installation detection laser scanning data; starting the mobile car to move according to the set moving speed, the multi-line laser radar performing laser scanning at the same time, and generating function detection laser scanning data;

S5, the acceptance control system obtaining installation detection laser scanning data and function detection laser scanning data for data processing, analysis, and judgment, the processing, analysis, and judgment comprising frequency judgment, clustering judgment, horizontal judgment, and orientation judgment;

the frequency judgment is as follows: the acceptance control system judges whether the number of frames of the laser scanning target object within a time period in the data matches the theoretical frame number of the laser scanning target object in the corresponding time period calculated by the known data through the function detection laser scanning data, if so, the laser scanning frequency is judged to be qualified, and if not, the laser scanning frequency is judged to be unqualified, the clustering judgment is as follows: using the clustering method to calculate whether there is a clustering of the target object in the laser scanning data, if not, it is judged that the laser scanning has errors and is unqualified; if so, it is judged whether the coordinates of the clustering center point comply with the coordinate system of the multi-line laser radar, if so, it is judged that the multi-line laser radar function acceptance is qualified, if not, it is judged that the laser scanning has errors and is unqualified;

the horizontal judgment and orientation judgment are as follows: the acceptance control system uses the least squares method to fit the linear equation of each scanning sign post in the multi-line laser radar coordinate system through the installation detection laser scanning data, the equation is as follows, $$\frac{X-x1}{m} = \frac{Y-y1}{n} = \frac{Z-z1}{p}$$

wherein X, Y, and Z are the variables of the scanning point in the multi-line laser radar coordinate system, x1, y1, and z1 are the coordinates of a certain point in the multi-line laser radar coordinate system, m is the direction along the X axis, n is the direction along the Y axis, and p is the direction along the Z axis;

calculating the value of p in the Z-axis direction of each scanning sign post, then calculating the mean value of p of multiple scanning sign posts, fitting the centers of X and Y planes of each scanning sign post in the multi-line laser radar coordinate system into a line on the X and Y planes, and calculating the value of k according to the following formula, $y=kx+b,$ where x and y are the coordinates of the points on the line in the X and Y planes, k is the slope of the line, and b is the intercept of the line;

judging whether the mean value of p is close to 1 (within the range of [−0.998, 0.998]) and whether the value of k is close to 0 (within the range of [−0.002, 0.002]), if the mean value of p is close to 1 and the value of k is close to 0, then judging that the roll angle, the pitch angle, and the direction angle of the installation of the multi-line laser radar are qualified (installed horizontally and with the O angle facing the front), ending the detection; if the mean value of p is not close to 1 and/or the value of k is not close to 0, judging that there is a deviation in the installation of the multi-line laser radar and the installation is unqualified;

when the frequency judgment, the clustering judgment, the horizontal judgment, and the orientation judgment are all qualified, the acceptance control system judging that the offline acceptance of the multi-line laser radar is passed, and providing the detection results, and ending the detection;

when there is non-conformity in the frequency judgment, the clustering judgment, the horizontal judgment, and/or the orientation judgment, the acceptance control system judging that the offline acceptance of the multi-line laser radar is not passed, and providing the detection results of the nonconformity in the judgment data, and ending the detection;

S6, after completing the detection, controlling the parking positioning means and the parking pointing means to reset and remove the automatic driving device from the acceptance parking platform.

2. A method for using an offline acceptance workshop of a multi-line laser radar automatic driving device, the method steps are as follows:

S1, initially, the offline acceptance workshop is in an initial state, which comprises a workshop main body, an acceptance parking platform, an acceptance detection means, and an acceptance control system; the workshop main body is a square shaped workshop, with walls on three sides and an entrance-exit on the other side; the acceptance parking platform is arranged on the ground inside the workshop main body for parking the automatic driving device, which comprises a horizontal platform carrying the automatic driving device, a parking positioning means for automatically adjusting the forward parking position of the automatic driving device, and a parking pointing means for automatically adjusting the fixed-point position of the tires of the automatic driving device; the acceptance detection means is arranged on a side wall opposite to the entrance-exit of the workshop main body, and the front end of the automatic driving device faces the acceptance detection means during detection, the acceptance control system is used to control the device traction means, the acceptance parking platform, and the acceptance detection means in the workshop main body for operation;

the offline acceptance workshop also comprises an device parking platform and an device traction means; the device traction means is used to pull the automatic driving device from the device parking platform to the acceptance parking platform or from the acceptance parking platform to the device parking platform, which is respectively arranged on two opposite walls;

the device parking platform is used for parking and adjusting the automatic driving device before automatic driving device entering the workshop main body, which comprises a bearing platform carrying the automatic driving device, an orientation adjusting mechanism that drives the bearing platform to rotate the angle, and a traverse adjusting mechanism that drives the bearing platform to traverse position;

the acceptance detection means comprises a function detection means for detecting whether the laser scanning function of the multi-line laser radar is normal, and an installation detection means for detecting whether the installation position of the multi-line laser radar is accurate;

the installation detection means consists of multiple scanning sign posts vertically arranged according to a set distance position, the scanning sign posts being horizontally arranged in front of the acceptance parking platform; the function detection means comprises a motion track, a mobile car, and a target object, the motion track being horizontally arranged according to a set distance position between the front of the acceptance parking platform and the installation detection means, the mobile car being provided with a driving means that drives the mobile car to move on the motion track, and the target object being vertically installed on the mobile car;

moving the automatic driving device to the bearing platform of the device parking platform;

S2, controlling the action of the orientation adjusting mechanism to make the bearing platform rotate until the front end of the automatic driving device faces the direction of the entrance-exit;

S3, controlling the action of the traverse adjusting mechanism to make the bearing platform traverse, and move to the corresponding middle section of the entrance-exit of the automatic driving device;

S4, controlling the device traction means, first controlling its action to overlap with the automatic driving device, and then controlling the traction movement action to pull the automatic driving device out of the acceptance parking platform from the entrance-exit and park, and when parking, the front and rear wheels of the automatic driving device respectively correspond to the parking positioning means;

S5, controlling the action of the parking positioning means so that the front and rear wheels are positioned in the front and rear directions and cannot move forward or backward;

S6, controlling the action of the parking pointing means so that the front and rear wheels are adjusted to the fixed-point position on the parking positioning means and fixed;

S7, starting the scanning work of the multi-line laser radar on the automatic driving device, the scanning work comprising laser scanning of multiple scanning sign posts by the multi-line laser radar, and generating installation detection laser scanning data; starting the mobile car to move according to the set moving speed, the multi-line laser radar performing laser scanning at the same time, and generating function detection laser scanning data;

S8, the acceptance control system obtaining installation detection laser scanning data and function detection laser scanning data for data processing, analysis, and judgment, the processing, analysis, and judgment comprising frequency judgment, clustering judgment, horizontal judgment, and orientation judgment;

the frequency judgment is as follows: the acceptance control system judges whether the number of frames of the laser scanning target object within a time period in the data matches the theoretical frame number of the laser scanning target object in the corresponding time period calculated by the known data through the function detection laser scanning data, if so, the laser scanning frequency is judged to be qualified; and if not, the laser scanning frequency is judged to be unqualified;

the clustering judgment is as follows: using the clustering method to calculate whether there is a clustering of the target object in the laser scanning data, if not, it is judged that the laser scanning has errors and is unqualified; if so, it is judged whether the coordinates of the clustering center point comply with the coordinate system of the multi-line laser radar, if so, it is judged that the multi-line laser radar function acceptance is qualified, if not, it is judged that the laser scanning has errors and is unqualified;

the horizontal judgment and orientation judgment are as follows: the acceptance control system uses the least squares method to fit the linear equation of each scanning sign post in the multi-line laser radar coordinate system through the installation detection laser scanning data, the equation is as follows:

$$\frac{X - x1}{m} = \frac{Y - y1}{n} = \frac{Z - z1}{p}$$

wherein X, Y, and Z are the variables of the scanning point in the multi-line laser radar coordinate system, x1, y1, and z1 are the coordinates of a certain point in the multi-line laser radar coordinate system, m is the direction along the X axis, n is the direction along the Y axis, and p is the direction along the Z axis; calculating the value of p in the Z-axis direction of each scanning sign post, calculating the mean value of p of multiple scanning sign posts, fitting the centers of each scanning sign post in the X and Y planes of the multi-line laser radar coordinate system into a line on the X and Y planes, and calculating the value of k according to the following formula, $$y = kx + b$$

where x and y are the coordinates of the points on the line in the X and Y planes, k is the slope of the line, and b is the intercept of the line; judging whether the mean value of p is close to 1 (within the range of [−0.998, 0.998]) and whether the value of k is close to 0 (within the range of [−0.002, 0.002]), if the mean value of p is close to 1 and the value of k is close to 0, then judging that the roll angle, pitch angle, and direction angle of the installation of the multi-line laser radar are qualified (installed horizontally and with the O angle facing the front), ending the detection;

and if the mean value of p is not close to 1 and/or the value of k is not close to 0, judging that there is a deviation in the installation of the multi-line laser radar and the installation is unqualified;

when the frequency judgment, the clustering judgment, the horizontal judgment, and the orientation judgment are all qualified, the acceptance control system judging that the offline acceptance of the multi-line laser radar is passed, providing the detection results, and ending the detection;

when there are non-conformity in the frequency judgment, the clustering judgment, the horizontal judgment, and/or the orientation judgment, the acceptance control system judging that the offline acceptance of the multi-line laser radar is not passed, and providing the detection results of the non-conformity in the judgment data, and ending the detection;

S9, after completing the detection, if the automatic driving device fails to pass the offline acceptance, first controlling the parking positioning means and the parking pointing means to reset, and then controlling the action of the device traction means to pull the automatic driving device out of the acceptance parking platform from the entrance-exit, and exit to the bearing platform of the device parking platform, and controlling the action of the orientation adjusting mechanism to make the bearing platform rotate according to the orientation needs of the automatic driving device, and move the automatic driving device away from the offline acceptance workshop;

if the automatic driving device passes the offline acceptance, first controlling the parking positioning means, the parking pointing means, and the device traction means to reset, and then directly controlling the automatic driving device to automatically drive and move away from the offline acceptance workshop; alternatively, first controlling the parking positioning means and the parking pointing means to reset, and then controlling the action of the device traction means to pull the automatic driving device out of the acceptance parking platform from the entrance-exit and exit to the bearing platform of the device parking platform, and controlling the action of the orientation adjusting mechanism to make the bearing platform rotate according to the orientation needs of the automatic driving device, and then move the automatic driving device away from the offline acceptance workshop.

3. A method for using an offline acceptance workshop of a multi-line laser radar automatic driving device as claimed in claim 2, wherein the device traction means comprises a traction moving track arranged on the inner side of the wall, a traction moving block sliding on the moving track, a traction connecting rod hinged on the traction moving block, a pushing cylinder arranged on the traction moving block and connected with the traction connecting rod, and a moving driving mechanism arranged on the traction moving block and the traction moving track, the traction connecting rod and the automatic driving device being respectively provided with traction mating parts.

4. A method for using an offline acceptance workshop of a multi-line laser radar automatic driving device as claimed in claim 2, wherein a sinking space is provided on the ground outside the entrance-exit of the workshop main body for installing a bearing platform;

the traverse adjusting mechanism comprises a transverse track arranged at the bottom of the sinking space, a transverse platform sliding on the transverse track, and a transverse driving mechanism connected with the transverse platform for driving its transverse, the bearing platform being a circular bearing platform covering the upper surface of the sinking space; the orientation adjusting mechanism comprises a rotating supporting connecting plate and a rotating driving mechanism connected between the lower surface of the bearing platform and the upper surface of the transverse platform.

5. A method for using an offline acceptance workshop of a multi-line laser radar automatic driving device as claimed in claim 2, wherein a front wheel positioning section groove and a rear wheel positioning section groove are transversely arranged on the horizontal platform, the parking positioning means is respectively arranged in the front wheel positioning section groove and the rear wheel positioning section groove, the parking positioning means comprises multiple bearing steel beams arranged to fill the front wheel positioning section grooves or the rear wheel positioning section grooves, supporting driving cylinders arranged at the bottom of each steel beam, and guiding structures respectively arranged at both ends of each steel beam, and pressure sensors arranged on each steel beam; the bearing steel beam, under the driving support of the supporting driving cylinder, can make its upper surface flush with the upper surface of the horizontal platform or form a staggered concave wheel groove on the upper surface of multiple bearing steel beams.

6. A method for using an offline acceptance workshop of a multi-line laser radar automatic driving device as claimed in claim 5, wherein the parking pointing means comprises a rear wheel point adjusting means and a front wheel point adjusting means; the rear wheel point adjusting means is respectively arranged at both ends of the rear wheel positioning section groove, which comprises a rear wheel moving push block and a rear wheel pushing block drive; the rear wheel moving push block is arranged on the upper surface of the horizontal platform and vertically crosses the rear wheel positioning section groove; the rear wheel pushing block drive is arranged outside the end of the rear wheel positioning section groove and connected with the rear wheel moving push block for driving its movement; the rear wheel moving push block is provided with a rear wheel push block guiding structure.

7. A method for using an offline acceptance workshop of a multi-line laser radar automatic driving device as claimed in claim 5, the front wheel pointing adjusting means is respectively arranged at both ends of the front wheel positioning section groove, which comprises a front wheel moving push block and a front wheel pushing block drive, the front wheel moving push block being arranged on the surface of a horizontal platform and vertically crosses the front wheel positioning section groove, the front wheel pushing block drive being arranged outside the end of the front wheel positioning section groove and connected with the front wheel moving push block for driving its movement and the front wheel moving push block being provided with a front wheel pushing block guiding structure;

25

26 and/or, the front wheel pointing adjusting means is symmetrically arranged on both sides of the middle point of the front wheel positioning section groove, which comprises a T-shaped moving push block, a T-shaped push block drive, and a T-shaped push block guiding structure; the T-shaped moving push block have a T-shaped cross-section, and is arranged on the upper surface of the horizontal platform and vertically crosses the front wheel positioning section groove; sliding grooves are respectively arranged on both sides of the front wheel positioning section groove, two ends of the T-shaped vertical arm of the T-shaped moving push block are respectively provided with connecting rods embedded in corresponding sliding grooves, the T-shaped push block drive is respectively arranged in the sliding grooves and connected with the connecting rods for driving its movement, and the T-shaped push block guiding structure is arranged between the connecting rods and the sliding grooves.

\* \* \* \* \*